United States Patent [19]

Brinkman et al.

[11] 3,932,258

[45] Jan. 13, 1976

[54] APPARATUS FOR THE CONTINUOUS PRODUCTION OF CHIPBOARD, FIBREBOARD AND LIKE PANELS

[75] Inventors: Heinz Brinkman, Bennigsen; Rolf Gersbeck, Hannover; Berndt Greten, Springe, all of Germany

[73] Assignees: Hermann Berstorff Maschinenbau GmbH, Hannover-Kleefeld; Bison-Werke Bahre & Greten GmbH & Co. KG, Springe, both of Germany

[22] Filed: June 10, 1974

[21] Appl. No.: 477,981

[30] Foreign Application Priority Data

June 9, 1973 Germany .......... 2329599

[52] U.S. Cl. .......... 156/498; 156/501; 156/582; 156/583; 425/83; 425/329; 425/407

[51] Int. Cl.$^{2}$... B29J 5/00; B32B 21/00; B29D 7/14

[58] Field of Search .......... 156/62.2, 62.6, 346, 347, 156/348, 494, 498, 501, 581, 582, 583; 425/83, 224, 329, 407, 409

[56] References Cited

UNITED STATES PATENTS

| | | | |
|---|---|---|---|
| 9,905 | 10/1881 | Palmer | 156/582 |
| 2,430,868 | 11/1947 | Francis | 156/583 |
| 2,685,548 | 8/1954 | Drozdowski | 156/582 |
| 3,039,137 | 6/1962 | Smith et al. | 425/83 |
| 3,088,859 | 5/1963 | Smith | 425/83 |
| 3,737,351 | 6/1973 | Ettel | 156/62.2 |

*Primary Examiner*—Caleb Weston
*Attorney, Agent, or Firm*—Donald D. Jeffery

[57] ABSTRACT

Apparatus for the continuous production of chipboard, fibreboard or like panels, comprising a tensioned endless steel belt guided over a plurality of rollers and partially around a heated revolvable press drum such that said rollers press the belt against said drum, sprinkler apparatus disposed over a portion of the belt which extends horizontally before said drum in the direction of movement of the belt such that material to form said panels sprinkled onto said portion of the belt is pressed between the belt and the drum to form a web of material, wherein at least one of said plurality of rollers has over its width a convexly ground surface, whereby panels produced on the apparatus can have substantially uniform thickness and weight.

The apparatus may include heating and/or cooling means for regulating the temperature of longitudinally extending zones of the belt and/or peripherally extending zones of said drum and/or said rollers thereby, due to thermal expansion or contraction, to regulate the tension in said longitudinally extending zones of said belt or to change the contour of the peripheral faces of said drum and said rollers to assist production of panels of uniform density and thickness across their width.

13 Claims, 5 Drawing Figures

APPARATUS FOR THE CONTINUOUS PRODUCTION OF CHIPBOARD, FIBREBOARD AND LIKE PANELS

The invention relates to press apparatus or the continuous manufacture of chipboard, fibreboard or like panels.

Apparatus for this purpose has been previously proposed comprising an endless steel belt guided over a plurality of rollers and partially around a heated and continuously revolving press drum and having over a part of the belt which extends horizontally in front of the press drum a sprinkling apparatus, whereby material to form the panel and sprinkled onto the endless steel belt, which belt is stretched taut and guided over pressure rollers, is pressed between the belt and the heated press drum to form a panel.

In such previous proposed press apparatus disclosed by German Pat. Specification No. 2,050,325, it is necessary for the pressure rollers to generate a linear pressure of approximately 400 Kg/cm and more, so that the continuously revolving press drum and also the pressure rollers become deformed and buckled in the pressing zone. These deformation phenomena are it is true eliminated again outside of the pressing zone since the shell of the press drum and of the pressure rollers springs back into its original position as a result of elastic tension equalisation, but the panel webs obtained have laterally marginal zones thinner than the middle portion of the panel. The reason for this lies in the gap which the deformation of the drum produces between the press drum and the pressure rollers, which gap is substantially smaller in width in the region of the ends of the press drum and rollers than it is in the middle portion of the press drum and pressure rollers when they yield under the action of the linear thrust forces.

The invention has among its objects to provide continuously operating press apparatus which can be operated to produce, economically, panels which are evenly pressed and have uniform thickness and weight.

According to the invention, there is provided apparatus for the continuous production of chipboard, fibreboard or like panels, comprising a tensioned endless steel belt guided over a plurality of rollers and partially around a heated revolvable press drum such that said rollers press the belt against said drum, sprinkler apparatus disposed over a portion of the belt which extends horizontally before said drum in the direction of movement of the belt such that material to form said panels sprinkled onto said portion of the belt is pressed between the belt and the drum to form a web of panel material, wherein at least one of said plurality of rollers has over its width a convexly ground surface, whereby panels produced on the apparatus can have substantially uniform thickness and weight.

Preferably said plurality of rollers co-operating with the endless belt and heated drum are adjustable in position towards and away from the drum and comprise, in succession and in the direction of movement of the belt around the drum, an intake roller, a pressure roller, a first calibrating roller and a second calibrating roller. By the use of rollers having convexly ground surfaces, it becomes possible, at the end of the complete pressing zone, for the panel web which is more thinly formed at its edges on occasion to be of equal thickness and weight over its entire width. The degree of convexity of said roller or rollers depends upon the buckling deformation of the press drum shell and on the inherent flexion in the rollers when under load, having regard to the elasticity modulus of the material used.

It is evident that the press drum and pressure roller shells could be made thicker in order to reduce the amount of buckling. However, this would greatly increase the material and manufacturing costs for the press drum and the pressure rollers. Furthermore, the transference of heat from the press drum, heated for example by steam, through its shell to the web of material to be pressed would be considerably reduced. The same applies with regard to the heatable pressure rollers.

The degree of convex curvature can be reduced if the steel belt and possibly also the press drum and the rollers are influenced by elongated heating and/or cooling rails, the temperatures of which can be controlled and which extend parallel to each other in the longitudinal direction of the belt or in the peripheral direction of the press drum.

The invention is diagrammatically illustrated by way of example in the accompanying drawings, in which.

Figure 1:
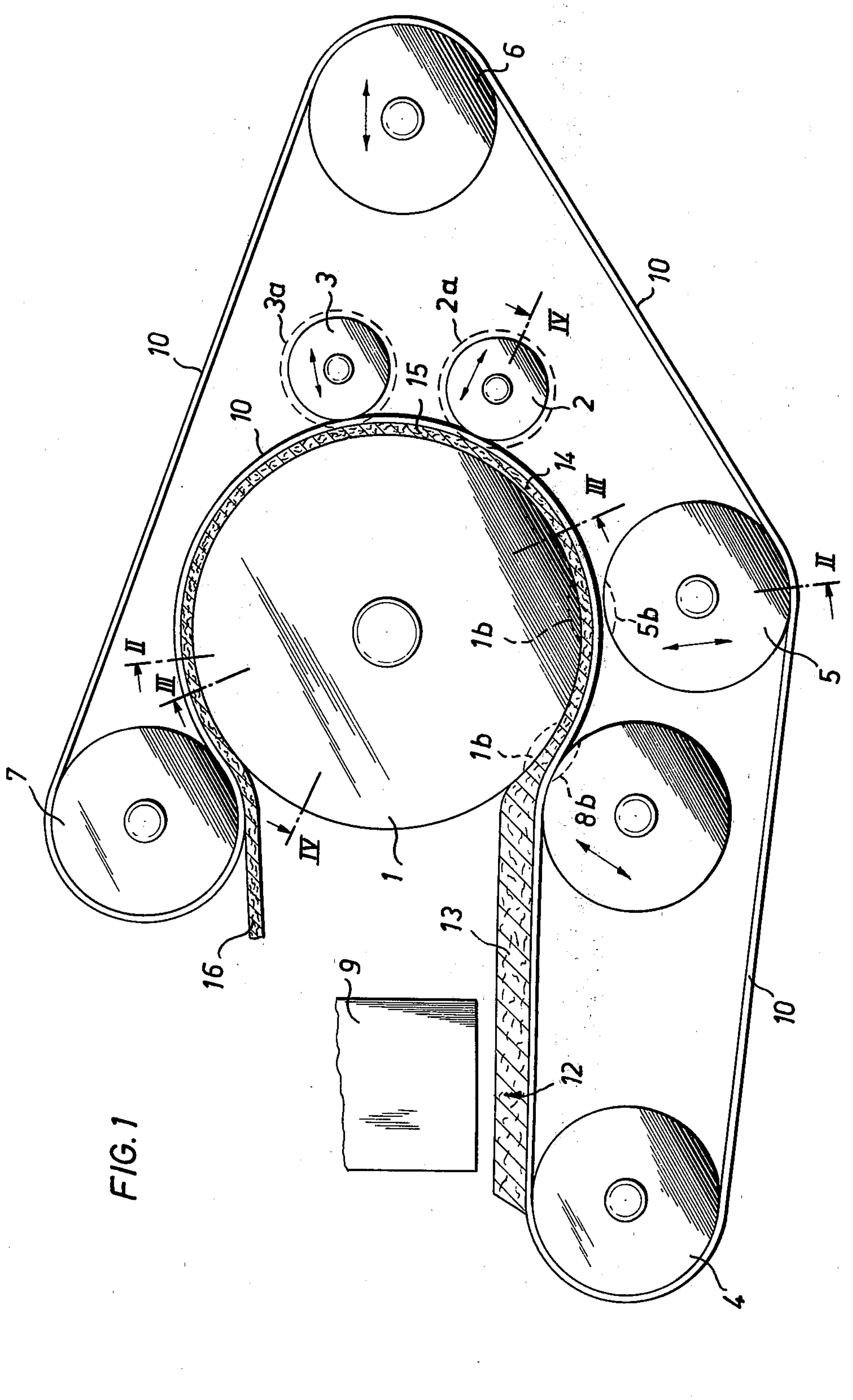
FIG. 1 is a side view of an apparatus according to the invention of chipboard panels.

Referring to the drawings, chips to be pressed after mixing with suitable binders, are sprinkled by sprinkling apparatus 9 onto an endless belt 10 in a definite pattern at a location 12. A mass 13 of sprinkled-on chips is intensely compressed in a gap between an intake roller 8 and a heated revolving drum 1.

The fleece of chips is further compressed in a gap between the drum 1 and a pressure roller 5 which serves at the same time as a direction-changing roller for the endless steel belt 10. The shell of the intake roller 8 and particularly of the heated press drum 1 and of the pressure roller 5 become buckled and deformed inwardly.

The buckled deformation of the press drum 1, of the pressure roller 5 and of the intake roller 8 is identified by references **1*b*, 5*b* and 8*b* respectively. Afterwards, the press web of material is calibrated by calibrating rollers 2 and 3.**

Return rollers 4 and 6, and an output roller 7, together with the intake roller 8 and the pressure roller 5, serve as direction-changing rollers for the endless steel belt 10. The drum 1 is heated so that during looping of the endless belt, kept under tension by the roller 6, around the drum 1, the layer of material disposed between the endless belt 10 and the drum 1 can be pressed into a web.

Figure 3:
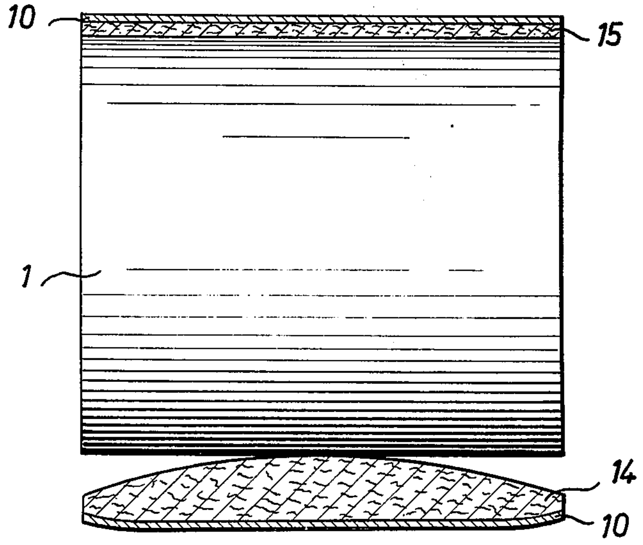
FIG. 3 shows a cross-section taken on Line III—III of FIG. 1 through the heating drum.

The buckling deformation **1*b*, 5*b* and 8*b* in the shell of the drum 1 and of the pressure rollers 5 and 8, caused by the application of pressure by the pressure rollers 5 and 8, produces a web of chipboard panel such as is shown in FIG. 3 and identified by reference numeral 14.**

A perfect pressing of the web of material is guaranteed only if simultaneously with the pressure created by the pressure rollers 5 and 8 and by the endless tensioned belt 10, there is also a sufficiently high temperature available for the binders to harden.

Calibrating rollers 2 and 3 provided between the rollers 5 and 7, are ground to a convex finish in accordance with the buckled deformation of the heated press drum 1 and of the pressure rollers 5 and 8, so that the middle zone of the panel web is subsequently compressed to the same degree as the two marginal zones. In consequence, a panel is obtained which is of regular thickness over its entire width.

Figure 4:
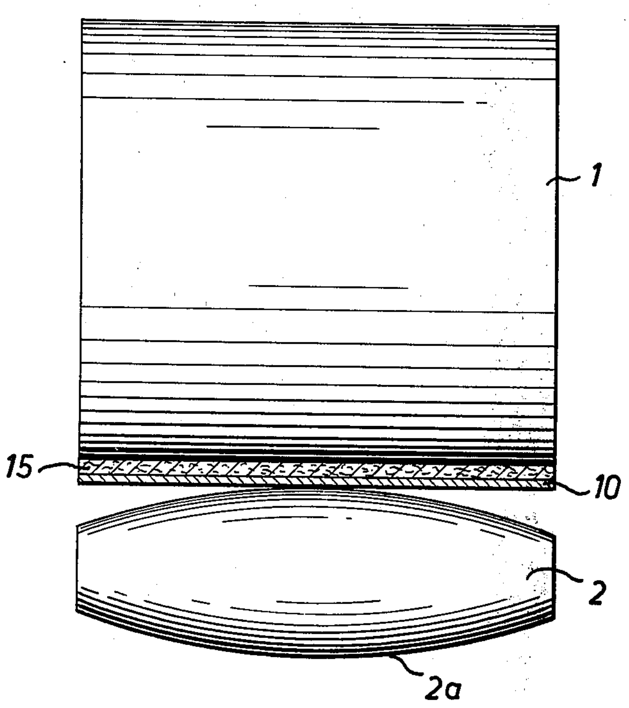
FIG. 4 shows a cross-section taken on Line IV—IV of FIG. 1 through the heating drum and a convexly ground calibrating roller.

FIGS. 1 and 4 indicate the curvature 2*a* and 3*a* of the calibrating rollers 2 and 3.

In order to ascertain the degree of curvature 2*a* required for the calibrating roller 2, the thickness of the panel web is measured after it has passed through the gap between the roller 5 and the drum 1. In accordance with the results of such measurements, which represent an exact reproduction of the buckled deformation 1*b* and 5*b* of the heating drum 1 and of the pressure roller 5, so the curvature can then be ground on the calibrating rollers 2 and 3.

Naturally, when designing the calibrating rollers 2 and 3, the inherent flexion in these rollers must also be taken into account, although this represents no problem by virtue of the known elasticity modulus of the material from which these rollers are made.

FIG. 4 shows the calibrating roller 2 in the operating position, i.e. the middle zone of the panel web, identified by reference numeral 14 in FIG. 3, still has a curvature. However, as FIG. 4 shows the curvature is already eliminated and the result is a web of material 15 of even thickness.

The disposition of the convexly ground calibrating rollers 2 and 3 likewise ensures that the web of chipboard panel produced has a completely regular specific weight and thus a completely regular strength over its entire width.

A completed web 16 emerging from the plant is fed to a machine for further processing.

In a practical example of a plant for the continuous manufacture of chipboard panels of a thickness of 1.6 to 10 mm the drum 1 had a diameter of 3,000 mm and the pressure roller 5 and the direction-changing rollers 4, 6, 7 and 8 a diameter of 1,400 mm. The endless belt 10 was approximately 43 m long and the drum and the rollers were mounted in stands with a height of 5,300 mm. The calibrating rollers 2 and 3 were approximately 800 mm in diameter and the working width of the plant was 2,100 mm.

The shell of the heated drum 1 was 50 mm thick and the shell of the pressure roller 5 was 30 mm thick. The buckling 1*b* on the drum shell was found to amount to 1.2 mm and on the pressure roller shell 0.4 mm. By correspondingly grinding the calibrating roller 2, a perfect chipboard panel web was obtained, its thickness being the same over its entire width.

Optionally, the calibrating process may be partially performed by the calibrating roller 2 and partially by the calibrating roller 3.

Furthermore, by adjusting various distances between the calibrating rollers 2 and 3 and the drum 1, it is also possible to calibrate webs of chipboard panels of various thicknesses, the calibrating work of these two calibrating rollers 2 and 3 being combined accordingly.

Figure 2:
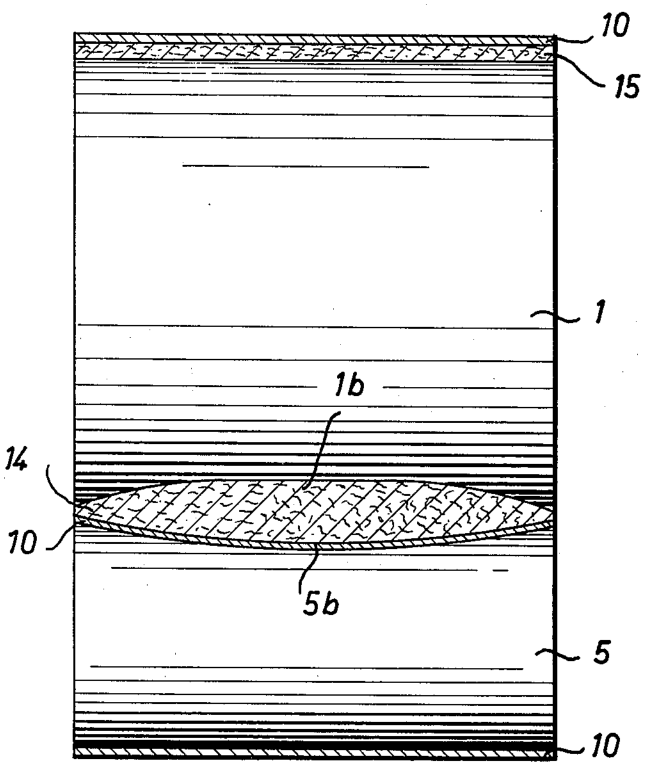
FIG. 2 shows a cross-section taken on Line II—II of FIG. 1 through a heating drum and through a pressure roller.

Additionally, alternatively or even solely, the convex grinding of the shells of the pressure roller 5 and/or 8 can result in a lessening or even an elimination of the deformation of the chipboard panel web identified by reference numeral 14 in FIG. 2. For this purpose, it is necessary to determine exactly the amount of the buckling deformation of the drum 1 and of the inherent flexion in the pressure rollers 5 and 8, which can be determined by calculations or also by test runs.

On the basis of the results thus obtained, so the pressure roller 5 and/or 8 can then be provided with a convex shell finish.

It lies within the framework of the invention to increase or reduce in particular the number of convexly ground rollers.

Figure 5:
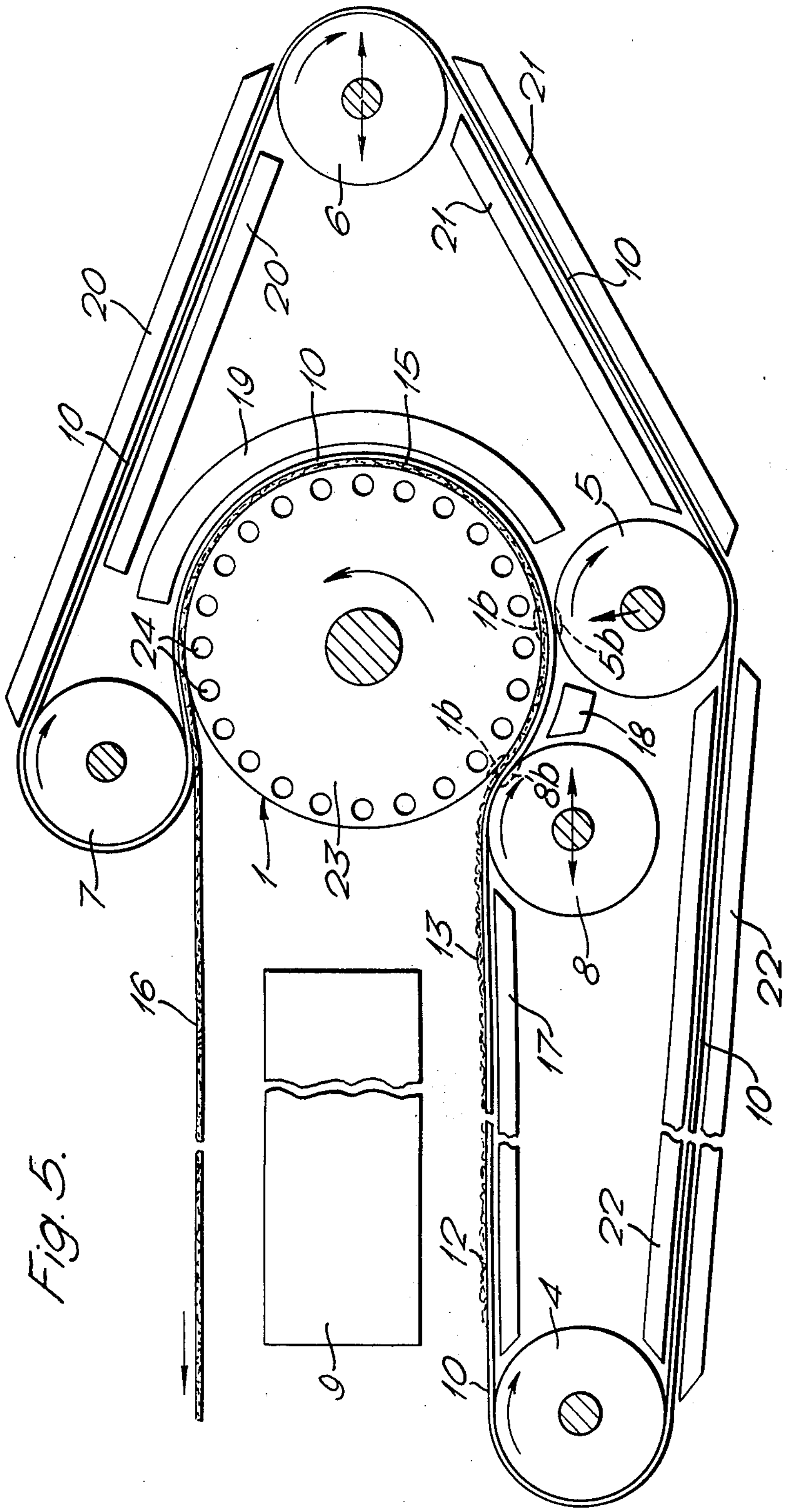
FIG. 5 shows apparatus similar to that shown in FIG. 1 but including elongated heating and/or cooling elements.

The embodiment shown in FIG. 5 illustrates the manner in which the degree of convex curvature can be reduced. The reference numerals substantially correspond to those used in FIGS. 1 to 3.

Disposed below the steel belt 10 between the roller 4 and the roller 8 are a plurality of heating and/or cooling elements 17 which extend parallel to each other and which permit the temperature of the steel belt 10 to be controlled in desired manner from below. In the same way, a plurality of heating elements 18 are disposed between the rollers 8 and 5, and correspondingly, further elements 19, 20, 21, and 22 are also provided between the other rollers, which elements can be provided either only on one or on both sides of the steel belt 10.

Individual elongated elements, each extending in a peripheral direction, are provided in an annular array within the drum 7. These individual elongated elements are connected by way of leads to sliding contacts which in turn control the temperature of the individual elements, by way of suitable regulating means (not shown).

The rollers 4, 5 and 8 may also be provided with peripherally extending elongated elements in an annular array in similar manner to the press drum 1.

Obviously both the press drum 1 and the rollers 4 to 8 can if necessary also or in addition, be heated with steam, water or oil. It is within the scope of the man skilled in the art to select the suitable kind of heating required in any particular case.

So that the basic concept of this further development can be understood, it will be firstly assumed that a chipboard panel web 15 being pressed is thicker in the marginal region than in the central region. If now the steel belt 10 is cooled in its two marginal regions, for example by a cooling agent supplied to the respective outermost cooling elements, then the lengths of the two edges of the steel belt are reduced, so that the tension which is thus produced causes the chipboard fleece to be pressed in the region of its edges more strongly against the peripheral surface of the press drum 1. This action makes it possible, in conjunction with the above-described convex curvatures, to produce a constant thickness for the chipboard panel web over its entire cross-section, without the degrees of curvature having to be excessively great, as is the case when there is no heating or cooling action.

If it turns out that the marginal regions of the chipboard panel web produced are of lesser thickness than the middle region thereof, then the outermost elements adjacent the belt are heated to increase the length of the steel belt at its marginal regions.

If it is found that the middle region of the chipboard panel web 15 is thinner than the two marginal regions, this can also be caused by deformation of the shell of the press drum. Owing to the supply of heat to the shell of the press drum, the middle region thereof can be caused to belly outwardly by some tenths. This can be compensated by reducing the temperature in the middle elements and possibly by increasing the temperature in the outer elements, which serve to heat the press drum. The supply of heat or the reduction in temperature can be controlled on the basis of measurements of the thickness of the chipboard panel web 9' produced. Sensing and control means which can do this are known, so that they do not need to be illustrated and described.

In order that the temperature of the two marginal regions of the shell of the press drum can be more precisely influenced, it is of advantage for openings 24 to be arranged in the end walls 23 of the press drum 1, such openings being uniformly distributed in the peripheral direction. Fitted into the openings 24 are for example members which can be electrically heated. Whether all the members provided are heated steplessly or whether for example each second or each third member is cut out, is not a matter of material importance. Control means for switching the electrically heatable members on and off are also known so that they do not need to be described.

What is claimed is:

1. Apparatus for the continuous production of panels of uniform weight and thickness over their entire width from compacted material, comprising a tensioned endless steel belt, drive means for moving said belt longitudinally, a plurality of rollers, a revolvable press drum, an outer shell for said drum, said belt being guided over said rollers and partially around said drum such that said rollers press said belt against said drum, heating means for said drum, and sprinkler apparatus disposed over a portion of said belt which extends horizontally before said drum in the direction of movement of said belt; said belt, said rollers, said drum, and said sprinkler apparatus being relatively so disposed that material to form said panels sprinkled onto said portion of said belt is pressed between said belt and said drum to form a web of material, at least one of said plurality of rollers having over its width a convexly ground surface, the degree of convexity of said roller being determined by the degree of buckling deformation of said drum experienced in operation and by the inherent flexion of said roller when loaded having regard to the elasticity modulus of the material from which said roller is formed.

2. The apparatus of claim 1, wherein said plurality of rollers co-operating with said belt and said drum are adjustable in position towards and away from said drum and comprise, in succession and in the direction of movement of said belt around said drum, an intake roller, a pressure roller, a first calibrating roller and a second calibrating roller.

3. The apparatus of claim 2, wherein said intake roller and said pressure roller are cylindrical and said first and said second calibrating rollers are convexly ground.

4. The apparatus of claim 2, wherein said intake roller and said second calibrating roller are cylindrical and said pressure roller and said first calibrating roller are convexly ground.

5. The apparatus of claim 2, wherein said intake roller and said first calibrating roller are cylindrical and said pressure roller and said second calibrating rollers are convexly ground.

6. The apparatus of claim 2, wherein said pressure roller and said first calibrating roller are cylindrical and said intake roller and said second calibrating roller are convexly ground.

7. The apparatus of claim 2, wherein said pressure roller and said second calibrating roller are cylindrical and said intake roller and said first calibrating roller are convexly ground.

8. The apparatus of claim 2, wherein said first calibrating roller is convexly ground and said intake roller, said pressure roller and said second calibrating roller are cylindrical.

9. Apparatus for the continuous production of panels of uniform weight and thickness over their entire width from compacted material, comprising a tensioned endless steel belt, drive means for moving said belt longitudinally, means for heating and cooling said belt to control the tension in said belt, a plurality of rollers, a revolvable press drum, an outer shell for said drum, said belt being guided over said rollers and partially around said drum such that said rollers press said belt against said drum, heating means for said drum, and sprinkler apparatus disposed over a portion of said belt which extends horizontally before said drum in the direction of movement of said belt; said belt, said rollers said drum, and said sprinkler apparatus being relatively so disposed that material to form said panels sprinkled onto said portion of said belt is pressed between said belt and said drum to form a web of material, at least one of said plurality of rollers having over its width a convexly ground surface, the degree of convexity of said roller being determined by the degree of buckling deformation of said shell of said drum experienced in operation and by the inherent flexion of said roller when loaded having regard to the elasticity modulus of the material from which said roller is formed.

10. The apparatus of claim 9, wherein end walls of said drum are formed with apertures whereby said end walls can be heated and cooled with a fluid medium.

11. The apparatus of claim 9, wherein end walls of said drum are formed with apertures, and electrically heatable members disposed in said apertures for heating said drum.

12. The apparatus of claim 9, wherein said means for heating and cooling said belt comprises a plurality of elongated heating and/or cooling elements extending parallel to one another and adjacent said steel belt, and means to control operation of said elements selectively to control the temperature of longitudinally extending zones of said belt and thus the tension in said zones thereby to affect the thickness of longitudinal zones of the panel being pressed, whereby the required extent of convex curvature of said rollers need not be excessive.

13. The apparatus of claim 12, wherein said means for heating and cooling said belt further comprises a plurality of elongated heating and/or cooling elements extending peripherally around said drum and between said rollers, the temperature of said elements being controllable selectively to regulate the temperature of peripherally extending zones of said drum and said rollers and thus to regulate the pressure applied to longitudinally extending zones of the panel being pressed to cause the panel to have a uniform thickness over its entire width.

* * * * *